United States Patent
Stamires et al.

(10) Patent No.: US 7,022,304 B2
(45) Date of Patent: Apr. 4, 2006

(54) DOPED ANIONIC CLAYS

(75) Inventors: Dennis Stamires, Newport Beach, CA (US); William Jones, Cambridge (GB); Paul O'Connor, Hoevelaken (NL)

(73) Assignee: Akzo Nobel N.V., (NL)

( * ) Notice: Subject to any disclaimer, the term of this patent is extended or adjusted under 35 U.S.C. 154(b) by 350 days.

(21) Appl. No.: 10/072,630

(22) Filed: Feb. 7, 2002

(65) Prior Publication Data

US 2002/0159940 A1    Oct. 31, 2002

Related U.S. Application Data

(60) Provisional application No. 60/267,470, filed on Feb. 9, 2001.

(30) Foreign Application Priority Data

Mar. 5, 2001 (EP) ................................ 01200831

(51) Int. Cl.
    *C01F 7/00* (2006.01)
(52) U.S. Cl. .................. 423/600; 423/594.16; 502/80; 502/84
(58) Field of Classification Search ................ 423/600, 423/594.16; 502/80, 84
    See application file for complete search history.

(56) References Cited

U.S. PATENT DOCUMENTS

| | | | |
|---|---|---|---|
| 4,946,581 A | 8/1990 | van Broekhoven | 208/120 |
| 4,952,382 A | 8/1990 | van Broekhoven | 423/244 |
| 5,507,980 A * | 4/1996 | Kelkar et al. | 264/15 |
| 5,578,286 A | 11/1996 | Martin et al. | 423/593 |
| 5,728,364 A | 3/1998 | Martin et al. | 423/593 |
| 5,728,365 A | 3/1998 | Martin et al. | 423/593 |
| 5,728,366 A | 3/1998 | Martin et al. | 423/593 |
| 5,730,951 A | 3/1998 | Martin et al. | 423/593 |
| 5,776,424 A | 7/1998 | Martin et al. | 423/593 |
| 6,028,023 A | 2/2000 | Vierheilig | 502/84 |
| 6,261,531 B1 | 7/2001 | Inoue et al. | 423/439 |

FOREIGN PATENT DOCUMENTS

| | | |
|---|---|---|
| WO | 96/30440 | 10/1996 |
| WO | 99/41195 | 8/1999 |
| WO | 99/41196 | 8/1999 |
| WO | 99/41197 | 8/1999 |
| WO | 99/41198 | 8/1999 |
| WO | 00/44671 | 8/2000 |
| WO | 00/44672 | 8/2000 |

OTHER PUBLICATIONS

Lopex-Salinas et al; New Gallium-Substituted Hydrotalcites: $[Mg_{1-x} GA_x(OH)_2] (CO_3)_{x/2} \cdot mH_2O$. Journal of Porous Materials vol. 3 pp. 169-174 (1996), no month.
International Search Report for PCT/EP 02/ 01235; dated Jul. 26, 2002.
*Catalysis Today.*; Hydrotalcite-Type Anionic Clays: Preparation, Properties, and Applications. 11 (1991) pp. 173-301; Cavani et al., no month.
Anionic Clays: Trends in Pillaring Chemistry, Synthesis in Microporous Solids; 2 (1992) pp. 108-169; Roy et al, no month.
Helv. Chim. Acta, 25, (1942) pp. 106-137 Von Feitknecht, no month.
Helv. Chim. Acta, 25, (1942) pp. 555-569; Von Feitknecht, no month.
*Journal of American Ceramic Society*; Studies on $4CaO-Al_2O_3 \cdot 13H_2O$ and the Related Natural Mineral Hydrocalumite. (1959) vol. 42 No. 3; pp. 121-126; Buttler et al., no month.
*Chemistry Letters*; Synthesis of New Hydrotalcite-Like Compounds and Their Physico-Chemical Properties. Miyata et al.; pp. 843-848 (1973), no month.
*Clays and Clay Minerals*; The Syntheses of Hydrotalcite-Like Compounds and Their Structures and Physico-Chemical Properties-I: The Systems; Miyata et al. vol. 23 (1975) pp. 369-375, no month.

(Continued)

*Primary Examiner*—Steven Bos
(74) *Attorney, Agent, or Firm*—Louis A. Morris

(57) ABSTRACT

The present invention is directed to a process for the preparation of a doped anionic clay. In said process a trivalent metal source is reacted with a divalent metal source, at least one of the metal sources being either doped boehmite, doped MgO or doped brucite, to obtain a doped anionic clay. Suitable dopants are compounds containing elements selected from the group of alkaline earth metals (for instance Ca and Ba), alkaline metals, transition metals (for example Co, Mn, Fe, Ti, Zr, Cu, Ni, Zn, Mo, W, V, Sn), actinides, rare earth metals such as La, Ce, and Nd, noble metals such as Pt and Pd, silicon, gallium, boron, titanium, and phosphorus.

12 Claims, No Drawings

OTHER PUBLICATIONS

*Clays and Clay Minerals*; Physico-Chemical Properties of Synthetic Hydrotalcites in Relation to Composition. Miyata et al.; vol. 28, No. 1, (1980) pp. 50-56, no month.

*Clays and Clay Minerals*; Syntheses of Discolored and Al-Rich Hydrotalcite-Like Compounds. Pausch et al.; vol. 34 No. 5; (1986) pp. 507-510, no month.

*Materials Chemistry and Physics*, Textural Properties of Hydrotalcite-Like Compounds . . . Ulibarri et al. vol. 14 (1986) pp. 569-579, no month.

European Search Report, for EP 01 20 0833, dated: Jul. 9, 2001.

* cited by examiner

1

DOPED ANIONIC CLAYS

CROSS REFERENCE TO RELATED APPLICATIONS

This application claims priority from U.S. patent application No. 60/267,470, filed Feb. 9, 2001, and European Patent Application No. 01200831.4, filed Mar. 5, 2001, the contents of both of which are included herein in their entirety.

BACKGROUND OF THE INVENTION

1. Field of the Invention

This invention relates to a process for the preparation of doped anionic clays, and doped anionic clays prepared by that process.

2. Prior Art

Anionic clays have a crystal structure that comprises positively charged layers built up of specific combinations of metal hydroxides between which there are anions and water molecules. Hydrotalcite is an example of a naturally occurring anionic clay, in which carbonate is the predominant anion present. Meixnerite is an anionic clay wherein hydroxyl is the predominant anion present.

In hydrotalcite-like anionic clays the brucite-like main layers are built up of octahedra alternating with interlayers in which water molecules and anions, more particularly carbonate ions, are distributed. The interlayers may contain anions such as $NO_3^-$, $OH^-$, $Cl^-$, $Br^-$, $I^-$, $SO_4^{2-}$, $SiO_3^{2-}$, $CrO_4^{2-}$, $BO_3^{2-}$, $MnO_4^-$, $HGaO_3^{2-}$, $HVO_4^{2-}$, $ClO_4^-$, $BO_3^{2-}$, pillaring anions such as $V_{10}O_{28}^{-6}$ and $Mo_7O_{24}^{6-}$, monocarboxylates such as acetate, dicarboxylates such as oxalate, alkyl sulphonates such as laurylsulphonate.

It should be noted that a variety of terms are used to describe the material that is referred to in this specification as an anionic clay. Hydrotalcite-like and layered double hydroxide is interchangeably used by those skilled in the art. In this specification we refer to these materials as anionic clays, comprising within that term hydrotalcite-like and layered double hydroxide materials.

The preparation of anionic clays has been described in many prior art publications. Two major reviews of anionic clay chemistry were published in which the synthesis methods available for anionic clay synthesis have been summarized: F. Cavani et al "Hydrotalcite-type anionic clays: Preparation, Properties and Applications," *Catalysis Today"*, 11 (1991) Elsevier Science Publishers B. V. Amsterdam; and J P Besse and others *"Anionic clays: trends in pillary chemistry, its synthesis and microporous solids"* (1992), 2, 108, editors: M. I. Occelli, H. E. Robson, Van Nostrand Reinhold, N.Y.

In these reviews the authors state that a characteristic of Mg—Al anionic clays is that mild calcination at 500° C. results in the formation of a disordered MgO-like product. Said disordered MgO-like product is distinguishable from spinel (which results upon severe calcination) and from anionic clays. In this specification we refer to said disordered MgO-like materials as Mg—Al solid solutions. Furthermore, these Mg—Al solid solutions contain a well-known memory effect whereby the exposure to water of such calcined materials results in the reformation of the anionic clay structure.

Two types of anionic clay preparation are described in these reviews. The most conventional method is co-precipitation (in Besse this method is called the salt-base method) of a soluble divalent metal salt and a soluble trivalent metal salt, optionally followed by hydrothermal treatment or aging to increase the crystallite size. The second method is the salt-oxide method in which a divalent metal oxide is reacted at atmospheric pressure with a soluble trivalent metal salt, followed by aging under atmospheric pressure. This method has only been described for the use of ZnO and CuO in combination with soluble trivalent metal salts.

For work on anionic clays, reference is further made to the following articles:
*Chemistry Letters* (*Japan*), 843 (1973)
*Clays and Clay Minerals*, 23, 369 (1975)
*Clays and Clay Minerals*, 28, 50 (1980)
*Clays and Clay Minerals*, 34, 507 (1996)
*Materials Chemistry and Physics*, 14, 569 (1986).

In addition there is an extensive amount of patent literature on the use of anionic clays and processes for their preparation.

Several patent applications relating to the production of anionic clays from inexpensive raw materials have been published. These materials include magnesium oxide and aluminum trihydrate.

WO 99/441198 relates to the production of anionic clay from two types of aluminum compounds and a magnesium source. One of the aluminum sources is aluminum trihydrate or a thermally treated form thereof.

WO 99/41196 discloses the preparation of anionic clays with acetate as the charge balancing anion from magnesium acetate, another magnesium source and aluminum trihydrate.

In WO 99/41195 a continuous process is described for the production of a Mg—Al anionic clay from a Mg source and aluminum trihydrate.

WO 99/41197 discloses the production of an anionic clay-containing composition comprising a Mg—Al anionic clay and unreacted aluminum trihydrate or a thermally treated form thereof.

Several patents describe the synthesis of hydrotalcites, i.e. anionic clays, out of magnesium oxide and a transition alumina in a batch-wise manner and under non-hydrothermal conditions: U.S. Pat. Nos. 5,728,364, 5,728,365, 5,728,366, 5,730,951, 5,776,424, 5,578,286. Comparative Examples 1–3 presented in these patents indicate that upon using aluminum trihydrate as aluminum source anionic clays are not formed.

There are many applications of anionic clays. These include but are not restricted to: catalysts, adsorbents, drilling muds, catalyst supports and carriers, extenders and applications in the medical field. In particular Van Broekhoven (U.S. Pat. Nos. 4,956,581 and 4,952,382) has described their use in $SO_x$ abatement chemistry.

For several applications the presence of additives, both metals and non-metals, within the anionic clay is desirable. These additives are used to alter or enhance certain properties of the anionic clay. For instance, Ce and V are added to the anionic clay to obtain material suitable for SOx removal in FCC. In general, these additives are deposited on the anionic clay by impregnation. With impregnation, however, it is often difficult to obtain a homogeneous dispersion of the additive within the anionic clay or it is difficult to deposit enough additive on the anionic clay to obtain the desired properties.

Some patent publications indicate that the additives may be added to the reaction mixture during preparation of the anionic clay. However, when additives are added to the reaction mixture, their presence may interfere with the anionic clay formation. For instance, when anionic clays are made by co-precipitation it is possible that the pH required to precipitate for example the divalent and the trivalent metal source may not be optimum for precipitation of the additive. In extreme situations the additive may be precipitated in advance of the divalent and trivalent metal sources or may not be sufficiently precipitated and remain in solution. Hence, with co-precipitation it is also difficult to control the amount and the dispersion of the additive in the anionic clay.

SUMMARY OF THE INVENTION

In one embodiment, the process according to the invention pertains to the preparation of doped anionic clay wherein a trivalent metal source is reacted with a divalent metal source, at least one of the metal sources being either doped boehmite or a doped magnesium source, i.e. doped brucite or doped MgO, to obtain a doped anionic clay.

Other embodiments of the invention are discussed below and include details concerning the composition of the various reactants, doped anionic clay obtained by the reaction, as well as shaped bodies, additives and catalysts comprising the doped anionic clay.

DETAILED DISCUSSION OF THE INVENTION

This invention relates to a process for preparing doped anionic clays, wherein the additive (hereinafter referred to as dopant) is already incorporated in the starting material. With this process anionic clays can be prepared containing controlled amounts of dopant. Further, the process allows controlled dispersion of the dopant within the anionic clay. Additionally, there is no need for pH control during the preparation process.

It was found that when using a doped starting material such as doped boehmite and/or a doped magnesium source, the amount of dopant incorporated into the anionic clay can be controlled easily, i.e. the dopant can be dispersed homogeneously and sufficient dopant can be incorporated in the anionic clay. It was found further that the dopant present either in the magnesium source and/or boehmite does not interfere with the formation of the anionic clay.

Upon being heated anionic clays generally form solid solutions, and at higher temperatures spinels. When used as a catalyst, an adsorbent (for instance a $SO_x$ adsorbent for catalytic cracking reactions), or a catalyst support, the anionic clay according to the invention is usually heated during preparation and is thus in the solid solution form. During use in a FCC unit, the catalyst or adsorbent is converted from an anionic clay into a solid solution.

Therefore, the present invention is also directed to a process wherein a doped anionic clay prepared by the process according to the invention, is heat-treated at a temperature between 300° and 1200° C. to form a doped solid solution and/or spinel.

Divalent and Trivalent Metal Sources

Suitable trivalent metal sources to be used in the process according to the present invention are compounds of the trivalent metals aluminum, gallium, indium, iron, chromium, vanadium, cobalt, vanadium, manganese, and combinations thereof.

Suitable divalent metal sources are compounds of the divalent metals magnesium, zinc, nickel, copper, iron, cobalt, manganese, calcium, barium, and combinations thereof.

The divalent and trivalent metal sources are preferably used in the form of oxides, hydroxides, carbonates, and hydroxycarbonates.

At least one of the divalent and trivalent metal sources used in the process according to the invention is doped. If only one doped metal source is used, it is either doped boehmite, doped MgO, or doped brucite. If additional doped metal sources are used the dopants in the various metal sources can be the same or different.

Furthermore, more than one trivalent metal and/or divalent metal can be used. For instance, a combination of doped and undoped boehmite can be used as the trivalent metal source, whereas a combination of doped and undoped magnesium source can be used as the divalent metal source.

The preferred amount of dopant in the doped anionic clays resulting from the process according to the invention is less than 70 wt. %, more preferably 1–50 wt. %, even more preferably 1–30 wt. %, and most preferably 1–15 wt. %.

Doped Boehmite

The term 'boehmite' refers to any kind of boehmite, i.e. microcrystalline boehmite or quasi-crystalline boehmite, e.g pseudoboehmite. The preferred type of boehmite is quasi-crystalline boehmite.

Doped boehmite can be prepared in several ways. In general, a boehmite precursor and a dopant are converted to a boehmite containing the dopant in a homogeneously dispersed state. Alternatively, boehmite is impregnated with the dopant.

Suitable dopants are compounds containing elements selected from the group of alkaline earth metals (for instance Ca and Ba), alkaline metals, transition metals (for example Mn, Fe, Co, Ti, Zr, Cu, Ni, Zn, Mo, W, V, Sn), actinides, rare earth metals such as La, Ce, Nd, noble metals such as Pt and Pd, silicon, gallium, boron, titanium, and phosphorus.

Suitable compounds—or dopant precursors—containing the desired elements are nitrates, sulfates, chlorides, formates, acetates, oxalates, alkoxides, carbonates, tungstates, and vanadates. The use of compounds with heat-decomposable anions is preferred, because the resulting doped boehmites can be dried directly, without intermittent washing, as anions undesirable for catalytic purposes are not present.

Examples of suitable preparation processes for the doped boehmites are described below:

Process 1

The boehmite can be prepared by hydrolyzing and aging an aluminum alkoxide in the presence of a compound containing the desired dopant(s). The dopant can be incorporated during the hydrolysis step or added at the end before the aging step.

Process 2

The boehmite can be prepared by hydrolysis and precipitation as hydroxides of soluble aluminum salts and aged to form a boehmite. Examples of suitable aluminum salts are aluminum sulfate, aluminum nitrate, aluminum chloride, sodium aluminate, and mixtures thereof. The dopant(s) may be added while the hydrolysis and precipitation are going on or at the end in the aging step.

Process 3

The boehmite can also be prepared by aging an aqueous slurry containing a thermally treated form of aluminum trihydrate and dopant(s) at temperatures ranging from 60 to 250° C. for a time sufficient to form boehmites, preferably at a temperature between 80 and 150° C. Thermally treated forms of aluminum trihydrate are calcined aluminum trihydrate and flash calcined aluminum trihydrate (CP® alumina). This preparation method has the advantage that no ions are introduced into the boehmite apart from any ions present in the dopant. That means that with the appropriate choice of dopant compounds washing steps can be reduced or avoided altogether. For instance, when decomposable anions (such as carbonate, nitrate, formate and oxalate) are used, the doped boehmite can be dried directly, as cations undesirable for catalytic purposes are not present.

Process 4

The doped boehmite can also be prepared by aging an aqueous slurry containing amorphous alumina gel and dopant(s) at temperatures ranging from 60° to 250° C., preferably at a temperature between 80° and 150° C., to form boehmites. Like process 3 mentioned above, this preparation method also has the advantage that no ions are introduced into the boehmite apart from the ions of the dopant. This means that with the appropriate choice of dopant washing steps can be reduced or avoided altogether.

Process 5

Doped boehmites to be used according to the invention can also be prepared by aging a relatively amorphous boehmite by thermal or hydrothermal treatment in the presence of compounds of the desired dopant to form a doped boehmite containing the dopant in a homogeneously dispersed state. More in particular, quasi-crystalline boehmites can be aged in the presence of dopant. If this aging is performed under hydrothermal conditions, a more crystalline doped boehmite will be obtained; if this aging is conducted thermally a less crystalline doped boehmite will be obtained.

No ions other than the ions of the dopant compound are introduced into the boehmite with this process.

Process 6

Doped boehmites can also be prepared by aging aluminum trihydrates such as gibbsite, BOC, and bayerite by hydrothermal treatment, with the aid of suitable boehmite seeds in the presence of compounds of the desired dopants. Suitable seeds are the known seeds to make microcrystalline boehmite such as commercially available boehmite (e.g. Catapal®, Condea P3®, Versal, and P-200®), amorphous seeds, milled boehmite seeds, and boehmite prepared from sodium aluminate solutions. Additionally, the seeds may have been doped. Also boehmites prepared by one of the processes described above can suitably be used as a seed. Alternatively, flash-calcined aluminum trihydrate can be used as a seed to convert aluminum trihydrate to boehmite. Like processes 3, 4, and 5 no ions other than the ions of the dopant (and the optional dopants present in the seed) are introduced into the boehmite.

If doped boehmite is used for the preparation of doped anionic clays according to the invention, combinations of boehmites with different dopants or combinations of a doped boehmite with another trivalent metal source can optionally be used.

Such trivalent metal sources may be oxides and hydroxides of aluminum, (e.g. sols, flash calcined alumina, gels, non-doped boehmite) aluminum salts such as aluminum nitrate, aluminum chloride, aluminum chlorohydrate and sodium aluminate, as well as sources of gallium, indium, iron, chromium, vanadium, cobalt, and manganese. Suitable gallium, indium, iron, chromium, vanadium, cobalt, manganese sources are the respective oxides, hydroxides, oxalates, carbonates, nitrates, chlorides, chlorohydrates, and alkoxides. Also mixtures of the above-mentioned trivalent metal sources can be used.

By using a combination of doped boehmite and non-doped aluminum sources the amount of dopant present in the final anionic clay can be controlled.

The doped boehmite and other trivalent metal sources may be pre-treated prior to the addition to the reaction mixture. Said pre-treatment may involve treatment with acid or base, thermal and/or hydrothermal treatment, or combinations thereof, all optionally in the presence of seeds.

It is not necessary to convert all of the trivalent metal source into doped anionic clay. Excess alumina improves the binding properties within the anionic clay and may also afford certain types of desirable functionalities to the anionic clay. For instance, alumina provides acid sites for catalytic cracking and boehmite improves the nickel encapsulation capacity of the anionic clay.

Doped Magnesium Source

Doped magnesium source, i.e. doped brucite or doped MgO, can be prepared by adding a dopant, such as the ones described above, to brucite, MgO, or a precursor thereof in an aqueous suspension and thermally treating said mixture to obtain the doped magnesium source. In this way doped brucite or MgO can be prepared, with the dopants being present in a homogeneously dispersed state. Alternatively, two or more water-soluble salts, one of which is a magnesium salt, can be precipitated to form doped brucite. Subsequently, doped brucite can be thermally treated to form doped MgO.

Suitable brucite or MgO precursors are $Mg(OH)_2$, hydromagnesite, magnesium salts such as magnesium acetate, magnesium formate, magnesium hydroxy acetate, magnesium carbonate, magnesium hydroxy carbonate, magnesium bicarbonate, magnesium nitrate, magnesium chloride, magnesium-containing clays such as dolomite, saponite, sepiolite.

Suitable dopants are compounds containing elements selected from the group of alkaline earth metals (for instance Ca and Ba), alkaline metals, transition metals (for example Mn, Fe, Co, Ti, Zr, Cu, Ni, Zn, Mo, W, V, Sn), actinides, rare earth metals such as La, Ce, and Nd, noble metals such as Pt and Pd, silicon, gallium, boron, titanium, and phosphorus.

Suitable compounds containing the desired elements are nitrates, sulfates, chlorides, formates, acetates, oxalates, alkoxides, carbonates, tungstates, vanadates, etcetera. The use of compounds with heat-decomposable anions is preferred, because the resulting doped magnesium source can be dried directly, without intermittent washing, as anions undesirable for catalytic purposes are not present.

If a doped magnesium source is used for the preparation of anionic clays according to the invention, combinations of doped magnesium sources or combinations of a doped magnesium source and another divalent metal source can also be used. Preferably the doped magnesium source is added to the reactor in the form of an aqueous suspension or slurry.

As mentioned above, in the process according to the invention divalent metal sources beside (or other than) the doped magnesium source may be added to the aqueous suspension such as metal sources of zinc, nickel, copper, iron, cobalt, manganese, calcium, barium. Suitable zinc, nickel, copper, iron, cobalt, manganese, calcium, barium sources are the respective oxides, hydroxides, carbonates, nitrates, and chlorides. Also mixtures of the above-mentioned divalent metal sources can be used. The divalent metal source may be pre-treated prior to the addition to the reaction mixture. Said pre-treatment may comprise a thermal and/or a hydrothermal treatment, an acid or base treatment, or combinations thereof, optionally in the presence of seeds.

By using a combination of doped magnesium source and non-doped magnesium source the amount of dopant in the anionic clay can be controlled.

It is not necessary to convert all of the divalent metal source into doped anionic clay. For instance, any excess magnesium, either doped brucite, doped MgO or another magnesium source will usually be present in the final product as brucite, magnesia or alumina-magnesia, doped or not, as the case may be. For the sake of clarity, this excess of magnesium compounds in the anionic clay will be referred to in the description as magnesia. The presence of said magnesia or alumina-magnesia in the anionic clay may provide desirable functionalities such as for instance metal trap capacity. The presence of magnesia provides basic sites that render the anionic clay suitable for removing or neutralizing acid components from or in strong acid streams of gases or liquids.

Doped Boehmite and Doped Magnesium Source

In the embodiment in which both doped boehmite and doped magnesium source are used in the process, the dopant in these doped compounds can be the same or different.

Conditions

The divalent and trivalent metal sources, at least one of them being either doped boehmite, doped MgO, or doped brucite, and optionally additional divalent and/or trivalent metal sources, are added to a reactor and heat-treated in aqueous suspension to obtain a doped anionic clay. The reactor may be equipped with stirrers or baffles to ensure homogeneous mixing of the reactants. The reaction can take place with or without stirring and at temperatures between 50° and 100° C. at atmospheric pressure and at higher temperatures (up to 400° C.) at increased pressure, i.e under hydrothermal conditions. The reactor may be heated by any heating source such as a furnace, microwave, infrared sources, heating jackets (either electrical or with a heating fluid), and lamps.

The aqueous suspension may be obtained by either adding slurries of the starting materials, either combined or separate, to the reactor or adding the divalent metal source to a slurry of trivalent metal source or vice versa and adding the resulting slurry to the reactor. It is possible to treat, for instance the doped boehmite slurry at elevated temperature and then add either the divalent metal source per se, or add the divalent metal source in a slurry or solution either to the reactor or the doped boehmite slurry.

The starting materials can be milled or otherwise treated in order to decrease their particle size, create a more reactive surface, or increase their reactivity. This treatment may be performed by using ultrasound, beading, ball milling, and sand milling.

The process according to the invention may be conducted batch-wise or in a continuous mode, optionally in a continuous multi-step operation. The process may also be conducted partly batch-wise and partly continuously.

The final anionic clay may conveniently be obtained by drying the resulting mixture.

If desired, organic or inorganic acids and bases, for example for control of the pH, may be fed to the reactor or added to either the divalent metal source or the trivalent metal source before they are fed to the reactor. An example of a preferred pH modifier is an ammonium base because upon drying no deleterious cations remain in the anionic clay.

The product formed may optionally be calcined at temperatures between 300° and 1200° C., preferably between 300° and 800° C. and most preferred between 300° and 600° C. This calcination is conducted for 15 minutes to 24 hours, preferably 1–12 hours and most preferred 2–6 hours. By this treatment the anionic clay will be transformed into a solid solution and/or spinel. Solid solutions posses the well-known memory effect, which means that they can be transformed back into anionic clays upon rehydration. This rehydration can be performed by contacting the solid solution with water for 1–24 hours at 65°–85° C. Preferably, the slurry is stirred and has a solids content ranging from about 10 to 50 wt %. During this treatment additives can be added.

Rehydration is optionally performed in the presence of anions, such as carbonate, bicarbonate, nitrate, chloride, sulfate, bisulfate, vanadates, tungstates, borates, phosphates, and pillaring anions such as $HVO_4^-$, $V_2O_7^{4-}$, $HV_2O_{12}^{4-}$, $V_3O_9^{3-}$, $V_{10}O_{28}^{6-}$, $Mo_7O_{24}^{6-}$, $PW_{12}O_{40}^{3-}$, $B(OH)_4^-$, $B_4O_5(OH)_4^{2-}$, $[B_3O_3(OH)_4]^-$, $[B_3O_3(OH)_5]^{2-}$, $HBO_4^{2-}$, $HGaO_3^{2-}$, $CrO_4^{2-}$, and Keggin-ions, formate, acetate and mixtures thereof.

If desired, the doped anionic clay prepared by the process according to the invention may be subjected to ion-exchange. Upon ion-exchange the interlayer charge-balancing anions are replaced with other anions. Said other anions are the ones commonly present in anionic clays and include pillaring anions such as $HVO_4^-$, $V_2O_7^{4-}$, $HV_2O_{12}^{4-}$, $V_3O_9^{3-}$, $V_{10}O_{28}^{6-}$, $Mo_7O_{24}^{6-}$, $PW_{12}O_{40}^{3-}$, $B(OH)_4^-$, $[B_3O_3(OH)_4]^-$, $[B_3O_3(OH)_5]^{2-}$, $B_4O_5(OH)_4^{2-}$, $HBO_4^{2-}$, $HGaO_3^{2-}$, $CrO_4^{2-}$, Keggin-ions, formates, acetate, and mixtures thereof. Examples of suitable pillaring anions are given in U.S. Pat. No. 4,774,212 which is included by reference for this purpose. Said ion-exchange can be conducted before or after drying the anionic clay-containing composition formed in the slurry.

The process of the invention provides wide flexibility in preparing products with a wide range of divalent to trivalent metal molar ratios. This ratio can vary from 0.1 to 10, preferably from 1 to 6, more preferred from 2 to 4, and especially preferred close to 3.

In addition to the dopants already incorporated into the anionic clay by using the doped boehmite or doped magnesium source, it may be desirable to add additional additives, both metal compounds and non-metal compounds, such as rare earth metals, Si, P, B, group VI, group VIII, alkaline earth (for instance Ca and Ba) and/or transition metals (for example Mn, Fe, Ti, Zr, Cu, Ni, Zn, Mo, Sn, V, W), to the anionic clay. Said additives can be deposited on the doped anionic clay according to the invention or they can be added either to the divalent metal source or the trivalent metal source which are added to the reactor or added to the reactor separately. Suitable sources of metal compounds or non-metal compounds are oxides, halides or any other salt such as chlorides, nitrates etcetera.

If an excess of trivalent compound is used a composition is obtained which contains doped anionic clay and also trivalent metal compound, usually in the form of an oxide or hydroxide. An example of such a composition is a composition comprising anionic clay and doped boehmite.

On the other hand, divalent metal sources may be used in excess to obtain a composition containing doped anionic clay and a divalent metal compound, usually in the form of an oxide or hydroxide. An example of such a composition is a composition comprising anionic clay and doped brucite.

It is even possible to prepare compositions containing anionic clay, trivalent metal compound and a divalent metal compound with the process according to the invention by controlling the process conditions. In those compositions the doped anionic clay, divalent metal compound, and/or trivalent metal compound are intimately mixed, rather than present as separate phases such as in physically mixed mixtures of doped anionic clay, divalent metal compound and/or trivalent metal compound. These compositions appear to be highly suitable for use as an additive or as a matrix for catalysts for hydrocarbon conversion. Moreover, these compositions appear especially suitable for sulfur removal from the gasoline and diesel fraction in FCC, $SO_x$ and $NO_x$ removal in FCC, hydroprocessing and as a metal trap.

The resulting doped anionic clays may optionally be shaped to form shaped bodies. If composites containing doped anionic clay and (doped) boehmite are formed, this boehmite can serve as a binder and create porosity in the shaped bodies.

The doped anionic clay-containing bodies may also be prepared in such a manner as to contain conventional catalyst components such as matrix or filler materials (e.g. clay such as kaolin, bentonite, hectorite, and synthetic smectites, titanium oxide, zirconia, alumina, silica, and silica-alumina), molecular sieve material (e.g. Y zeolite, USY zeolite, ion-exchanged Y zeolite, ZSM-5, beta-zeolite, and ST-5). Typically, such conventional catalyst components or precursors thereof may be added prior to the shaping step.

Suitable shaping methods include spray-drying, pelletizing, extrusion (optionally combined with kneading), granulation, beading, or any other conventional shaping method used in the catalyst and absorbent fields or combinations thereof. The amount of liquid present in the slurry used for shaping should be adapted to the specific shaping step to be conducted. It might be advisable to partially remove the liquid used in the slurry and/or add an additional or another liquid, and/or change the pH of the precursor mixture to make the slurry gellable and thus suitable for shaping. Various additives commonly used in the various shaping methods such as extrusion additives may be added to the precursor mixture used for shaping.

The doped anionic clay can suitably be used as a component of a catalyst composition.

The present invention is illustrated by the following examples.

EXAMPLES

Example 1

A suspension of Alcoa CP-3® alumina in a $Zn(NO_3)_2$ solution was homogenized by high shear mixing for 15 minutes. The slurry was aged at 85° C. for 24 hours. This resulted in a $Zn^{2+}$ doped boehmite containing around 10 wt % ZnO based on the weight of alumina as $Al_2O_3$.

To the doped boehmite-containing slurry a MgO-containing slurry with a pH of 7.42 and a temperature of 44° C. was added in an amount sufficient to obtain a Mg/Al molar ratio of 2.3. Subsequently, the mixture was aged at 85° C. for 24 hours. The slurry had a solids content of approximately 25 wt % and a pH of 8.92. The final product was dried at 100° C. Powder X-ray diffraction (PXRD) indicated the formation of anionic clay.

Example 2

Example 1 was repeated, except that the mixture was aged hydrothermally at 165° C. and autogenous pressure for 2 hours. Just as in Example 1 the slurry had a solids content of approximately 25 wt % and a pH of 8.92. The final product was dried at 100° C. PXRD indicated the formation of anionic clay.

Example 3

Example 1 was repeated, except that prior to aging of the mixture $NaOH/Na_2CO_3$ (1M final concentration) was added to it. Subsequently, the mixture was aged at 85° C. for 24 hours. The initial pH of the slurry was 10. The product was filtered, washed with water and dried at 100° C. PXRD indicated the formation of anionic clay.

Example 4

$La_2O_3$-doped quasi-crystalline boehmite was prepared by co-precipitating aluminum sulfate and sodium aluminate to a final pH of 10, at 85° C. and in the presence of $La(NO_3)_3$. The precipitate was aged at 80° C. for 24 hours and subsequently dried at 90° C. overnight. The doped boehmite contained 10 wt % $La_2O_3$.

MgO and $Na_2CO_3$ (final concentration 1M) were added to the doped boehmite-containing slurry. The Mg/Al ratio in the slurry was 2.3. The resulting slurry was aged at 80° C. for 12 hours. The product was filtered and dried overnight at 100° C. PXRD indicated the formation of anionic clay.

Example 5

$CeO_2$-doped boehmite was prepared by suspending Alcoa CP-3® alumina in a $(NH_4)_2Ce(NO_3)_6$ solution with a pH of 7.42 and a temperature of 44° C. with high shear mixing for 15 minutes. The suspension was treated at 85° C. for 24 hours. The product was not dried, and the resulting doped boehmite contained about 10 wt % $CeO_2$.

MgO was added to the slurry. The resulting slurry had a pH of 8.92, a solids content of about 25 wt % and a temperature of 52° C. The Mg/Al ratio in the slurry was 2.3. The slurry was aged at 85° C. for 24 hours. The product was dried overnight at 100° C. PXRD indicated the formation of anionic clay.

Example 6

Example 5 was repeated, except that the slurry was aged hydrothemally at 165° C. at autogenous pressure for 4 hours. The product was dried overnight at 100° C. PXRD indicated the formation of anionic clay.

Example 7

A solution was prepared containing 500 g magnesium nitrate hydrate and 30.53 g zinc nitrate in 1500 g water. The metals were co-precipitated by the addition of sodium hydroxide. The precipitate was washed and filtered, dried at 110° C. overnight. The product was a Zn-doped brucite.

A portion (113.5 g) of the dried cake of the Zn-doped brucite was then slurried in 450 g water. Subsequently, 8.92 g of flash-calcined gibbsite (Alcoa CP®) was added and the mixture was high shear mixed for 10 minutes. The mixture was aged at 65° C. for 6 hours and the resulting product was dried at 110° C.

PXRD confirmed the formation of a Zn-doped Mg—Al anionic clay along with an amount of the Zn-doped brucite.

Example 8

The Zn-doped brucite of Example 7 was mixed with a solution of gallium nitrate. The pH was adjusted to 9. The mixture was divided into two. One part was aged at 85° C. overnight and the other 195° C. for 1 hour. The compositions resulting from these treatments both comprised Zn-doped Mg—Ga anionic clay along with some Zn-doped brucite.

The invention claimed is:

1. A process for the preparation of doped anionic clay wherein a trivalent metal source is reacted with a divalent metal source, at least one of the metal sources being doped boehmite, doped MgO or doped brucite, having dopant incorporated and dispersed homogeneously therein to obtain a doped anionic clay, said doped boehmite being prepared by converting a boehmite precursor and a dopant to a boehmite containing the dopant in a homogeneously dispersed state, said doped MgO or doped brucite being prepared by adding a dopant to a MgO or brucite precursor in aqueous suspension and thermally treating the resulting mixture.

2. The process of claim 1 wherein doped boehmite is reacted with a divalent metal source.

3. The process of claim 1 wherein doped brucite is reacted with a trivalent metal source.

4. The process of claim 1 wherein doped MgO is reacted with a trivalent metal source.

5. The process of claim 2 wherein in addition to the doped boehmite another trivalent metal source is present in the reaction mixture.

6. The process of claim 3 wherein in addition to the doped brucite another divalent metal source is present in the reaction mixture.

7. The process of claim 4 wherein in addition to the doped MgO another divalent metal source is present in the reaction mixture.

8. The process of claim 1 wherein the trivalent metal source and the divalent metal source are reacted under hydrothermal conditions.

9. The process of claim 1 wherein the doped boehmite, the doped MgO and/or the doped brucite contain a rare earth metal compound as dopant.

10. The process of claim 1 wherein the doped boehmite, the doped MgO and/or the doped brucite is added in excess to obtain a composition comprising anionic clay and doped boehmite, doped MgO and/or doped brucite.

11. A process for the preparation of a doped Mg—Al solid solution and/or spinel, wherein an anionic clay obtained by the process of claim 1 is subjected to a heat-treatment at a temperature between about 300° and about 1200° C.

12. A process for the preparation of doped anionic clay, wherein the Mg—Al solid solution obtained by the process of claim 11 is rehydrated to form a doped anionic clay.

* * * * *